Feb. 14, 1967 M. STRASSBERG 3,304,133
GUIDING DEVICE
Filed July 30, 1965 2 Sheets-Sheet 2

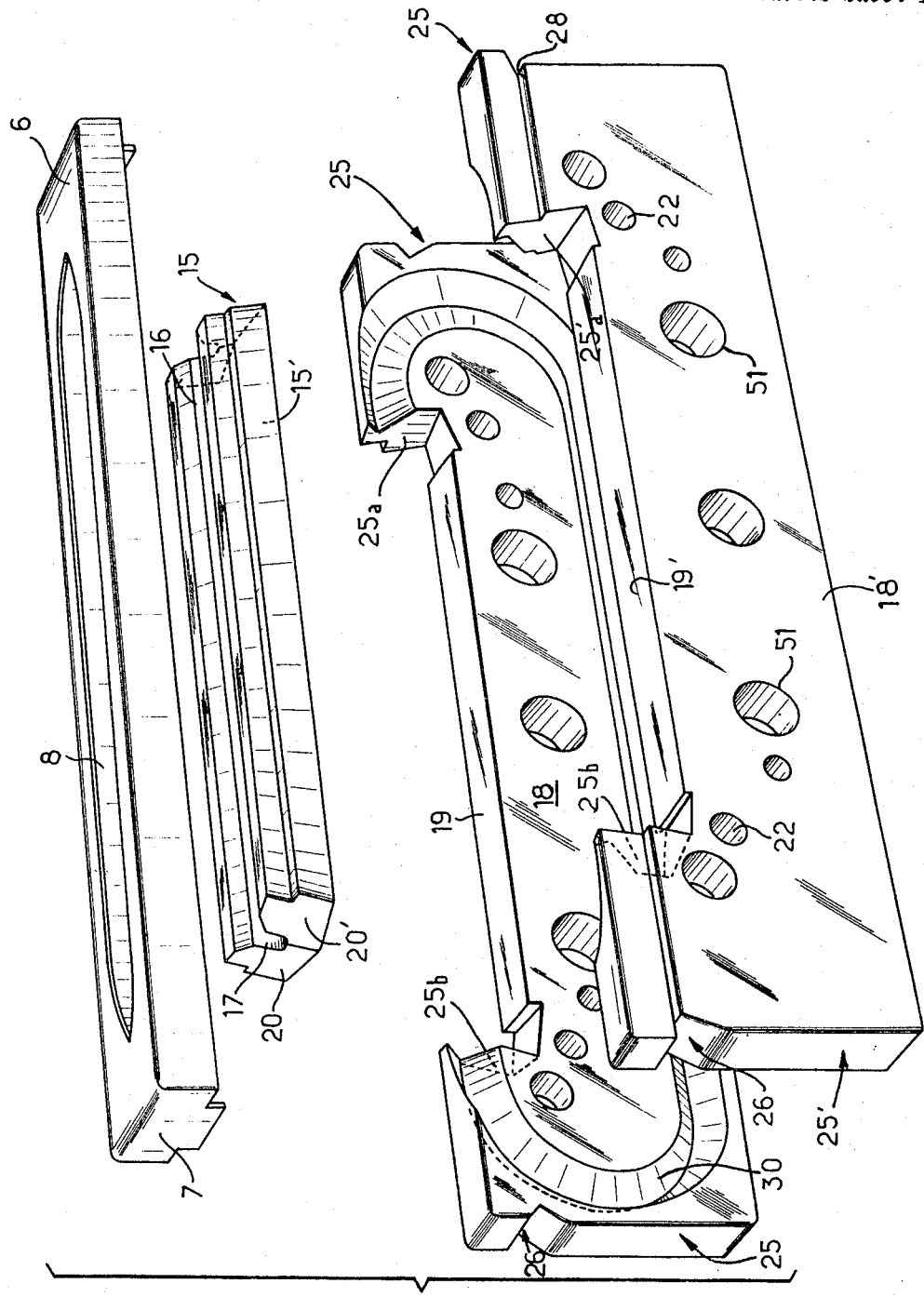

INVENTOR
MAXIMILIEN STRASSBERG
By Young + Thompson
ATTYS.

3,304,133
GUIDING DEVICE
Maximilien Strassberg, 4 Rue de Voize,
Neuilly-Plaisance, France
Filed July 30, 1965, Ser. No. 476,023
Claims priority, application France, May 24, 1962,
898,587, Patent 1,331,533
7 Claims. (Cl. 308—6)

This application is a continuation-in-part of my co-pending application Serial No. 278,178, filed May 6, 1963, now abandoned.

The present invention relates to guiding devices, and particularly to guiding devices utilizing a continuous train of crossed roller bearings.

For the many industrial applications requiring the linear movement of relatively heavy or cumbersome units, many types of low friction bearing devices have been proposed. One such class of devices utilizes a movable member having a longitudinal groove of triangular cross section which is disposed opposite a similar groove in a stationary support member, the two grooves forming a rectangular conduit in which are disposed a plurality of cylindrical roller bearings which act to support the movable member. The bearings are often arranged so that the cylindrical surface of each alternate bearing rests on one side of each groove while the cylindrical surface of each of the remaining bearings rests on the other side of each groove. Such an arrangement lends itself well to the supporting of heavy loads because roller bearings have a larger area of contact with the surfaces along which they roll than do ball bearings and because the alternation of the groove side upon which each successive bearing rolls has the effect of reducing practically to zero the lateral play between the movable member and the stationary member. In addition, a device of this kind can work at high speed without the danger of creating parasitic vibrations since it is practically impossible for vibrations at the resonant frequency of bearings in this shape to develop during the course of normal operation.

However, such devices are subject to several drawbacks, particularly in that the form of construction of these devices has been such that the entire movable member must be replaced if its load bearing surfaces should become worn, and the movable member could not be easily removed from the stationary member because such a separation would enable the roller bearings to escape from the movable member.

It is a general object of the present invention to eliminate the above-noted drawbacks.

It is a more specific object herein to reduce the cost of replacing the worn load bearing surfaces in a movable member of the type described above.

Another object of this invention is to simplify the assembly and disassembly of such movable members.

Yet another object herein is to permit the ready removal of the movable member of such a device from its associated stationary member while preventing the escape of roller bearings from said movable member.

The present invention is primarily concerned with certain improvements in a guide shoe for carrying a continuous train of "crossed roller bearings," i.e., cylindrical roller bearings which are arranged so that the axis of rotation of each roller bearings is perpendicular to the axes of rotation of the roller bearings immediately adjacent thereto. A portion of one longitudinal face of the shoe is defined by a unitary sole plate having an outer longitudinal surface in which is formed a longitudinal groove for guiding said roller bearings. The longitudinal groove is so placed that the roller bearings therein extend partially beyond the guide shoe for engagement in a similar longitudinal groove in a guide rail along which said shoe is to move.

The remainder of said guide shoe is formed with a bearing recirculating channel of suitable cross section extending from one longitudinal end of said sole plate to the other longitudinal end thereof to permit the continuous recirculation of the roller bearings. According to the principle features of the present invention, the components of the guide shoe are so formed that the sole plate groove is automatically aligned with the bearing recirculation channel when the shoe is assembled, and retaining means are provided for permitting a substantial portion of the bearing surface of each roller bearing to engage in the guide rail groove while preventing these bearings from escaping from the guide shoe when the latter is removed from the guide rail.

The sole plate longitudinal groove has a cross section in the form of an isosceles right triangle whose apex is at the bottom of the groove and the guide rail groove has a similar cross section, while the guide shoe recirculation channel has a square cross section of suitable dimensions to permit the passage of the roller bearings from one end of the sole plate to the other end thereof. Specifically, each side of the square defining the cross section of the recirculation channel is made slightly larger than the diameter of the roller bearings which are to be used, these roller bearings having an axial height which is slightly less than their diameter.

In a preferred embodiment of the present invention, an extremely simple guide shoe is formed of only three basic components: a unitary sole plate and two flat plates. The sole plate is an elongated member having its longitudinal groove extending completely along one of its longitudinal sides and having a pair of end faces defining the longitudinal extremities of said sole plate. The guide shoe flat plates are generally C-shaped and are arranged so that each extends around the sole plate from one side of one of its end faces to the corresponding side of the other of its end faces. These flat plates are provided with suitable bearing surfaces which are arranged to mate with the end faces of the sole plate, these end faces being so shaped that when the guide shoe is assembled the flat plates rigidly hold the sole plate in its correct position without the need of any auxiliary fastening means. This arrangement thus permits the construction of an extremely simple guide shoe which is easy to assemble and disassemble and which thus permits the rapid replacement of a worn sole plate.

A device of the type described above may be completed, in accordance with the principles of the present invention, by a retaining member which is removably mounted on said shoe after the roller bearings have been placed therein. This retaining member has a longitudinal slot which is aligned with the longitudinal groove in the sole plate and which has a width which is large enough to permit a substantial portion of each roller bearing to extend beyond the retaining member but which is small enough to prevent the roller bearings from escaping from the shoe when the latter is removed from its associated guide rail. Thus the provision of such a retaining member permits the guide shoe to be treated as a self-contained unit which can be removed from and replaced on its associated guide rail without the necessity for resorting to any complicated maneuvers for preventing the loss of roller bearings. It should be noted that the prior art teaches the provision of retaining means in connection with ball bearings, but that this arrangement has never proved wholly satisfactory because the ball bearing can only be permitted to extend a small distance beyond the retaining means if that means is to reliably perform its retaining function and still give the balls sufficient clearance when the guide shoe is in use. The use of a retaining means with roller bearings, however obviates these drawbacks because the shape of a roller bearing, i.e., its rectangular cross section in a plane perpendicular to the direction in which it moves, enables it to extend a substantial distance beyond its associated retaining means without increasing the chances of its escaping from the guide shoe.

These and other objects, features and advantages of the present invention will become more readily apparent from the following detailed description when taken together with the attached drawings, in which:

FIGURE 1 is an exploded perspective view of a preferred embodiment of the present invention;

Figure 3:
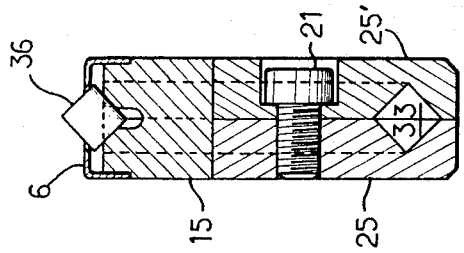
FIGURE 3 is a fully assembled cross-sectional view taken along the line III—III of FIGURE 2.

In accordance with the form of embodiment chosen and shown in the drawings, a guiding device according to the invention comprises at least one guide shoe intended to be associated with a guide rail in which is formed a longitudinal groove of triangular cross section.

Turning first to FIGURE 1, the guide shoe comprises a lower sole plate 15 in the general shape of a parallelipiped, made of tempered steel, in the outer longitudinal surface of which is formed a longitudinal groove 16 having the same cross section as the above-mentioned rail groove, the shoe also being provided with a small widening groove 17 at the bottom of the groove 16. This sole plate 15 is assembled to two flat plates 18 and 18' made of ordinary steel, which plates are joined to each other along a plane which coincides with the plane bisecting the sole plate groove 16, and which bear against this sole plate along the upper faces 19 and 19', respectively, of the flat plates, and also along the two bearing planes 20 and 20' of each of the end faces of the sole plate.

The assembly of the flat plates 18 to each other is effected by means of at least one bolt 21 (FIGURE 3) and also by means of at least two studs 22 carried by one of the flat plates and fitting into corresponding recesses formed in the other flat plate.

Figure 2:
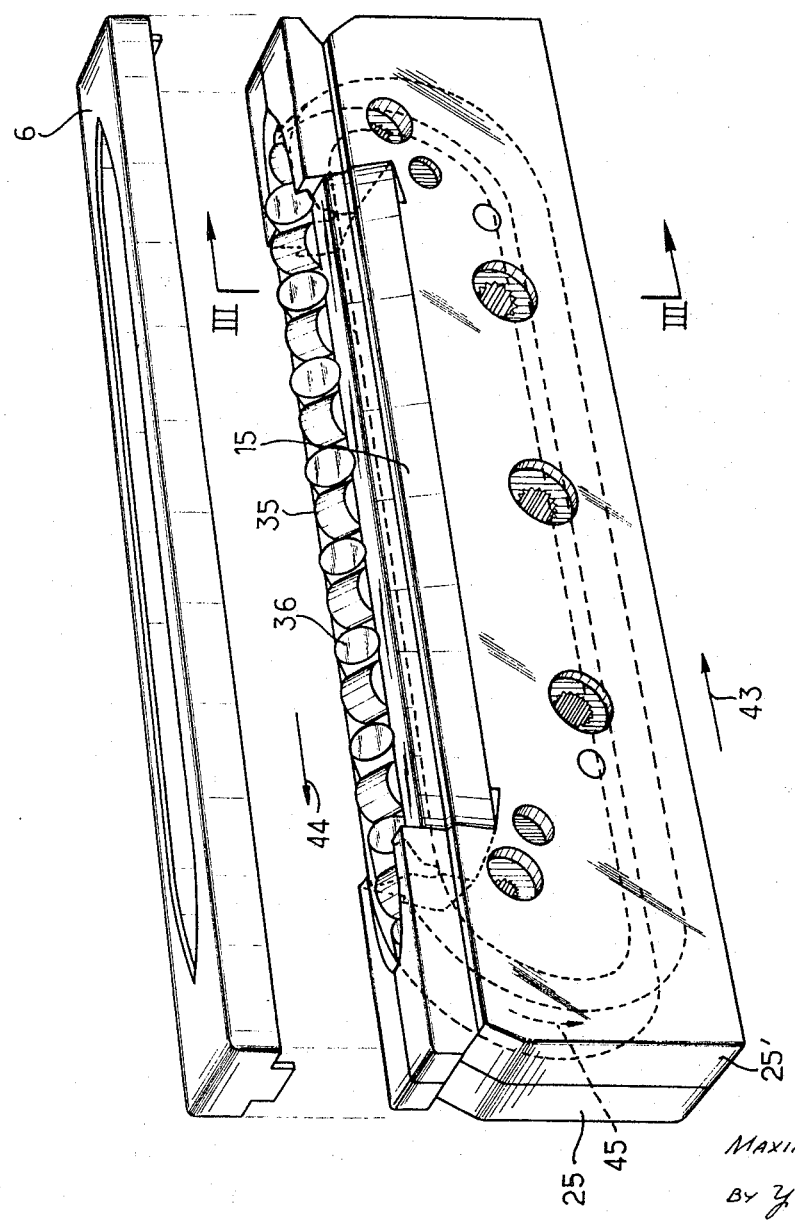
FIGURE 2 is a partially exploded perspective view of the embodiment of FIGURE 1 after the introduction of roller bearings.

In accordance with one of the principal features of the present invention, the sole plate 15 is rigidly held in position in flat plates 18 and 18' solely through a three-dimensional wedging action produced by the combined bearing pressures of upper faces 19 and 19' on the inner longitudinal surface 15' of sole plate 15 and of flat plate faces 25a–25'a and 25b–25'b on the contact surfaces 20–20' of each respective end face of the sole plate. The flat plate faces 19 and 19' are coplanar with one another and act merely as a support for the flat inner longitudinal surface 15' of sole plate 15. In order to cause sole plate 15 to be rigidly held in position in the assembled shoe, each end face of the sole plate is formed with a pair of planar contact surfaces 20 and 20' which are oblique to one another and to the plane bisecting groove 16, and which are symmetrically disposed with respect to said bisecting plane. The value of the dihedral angle between surfaces 20 and 20' is determined according to the magnitude of the transverse forces to which the sole plate will be subjected. The apex of the dihedral angle is directed away from the interior portion of the sole plate, as is shown in the drawings. Thus, in the preferred embodiment of the present invention the sole plate end faces are shown to have a slight taper. In the assembled shoe (see FIGURE 2), the contact surfaces thus far described cooperate with the similarly oriented flat plate faces 25a, 25'a, 25b, 25'b to restrain the sole plate from transverse horizontal movement with respect to the flat plates. In order to prevent the sole plate from moving with respect to the flat plates in a direction perpendicular to the plane of surface 15', the contact surfaces of one or both sole plate end faces are also oriented so that at least one pair of bearing planes 20 and 20' forms an acute dihedral angle with inner longitudinal surface 15'. The corresponding flat plate faces 25a–25'b are given similar slopes so as to permit each respective contact surface to lie flat against its corresponding flat plate face. It should be noted that it is not necessary for both sole plate end faces to have the same slope with respect to surface 15', or even for both end faces to be oblique with respect to said surface; it is only necessary that the combined slopes of the two end faces be adequate to cause the length of the sole plate outer longitudinal surface to be less than the length of its inner longitudinal surface. When this relation exists, the joint between the sole plate and the flat plates, in the assembled shoe, is in the from of a dovetail, with the sole plate being equivalent to a tenon and the flat plate faces acting as mortises, which serves to restrain the sole plate from any displacement whatsoever with respect to the flat plates.

Each of the plates 18 is provided with a groove 30 forming a loop which passes from one end face to the other end face of the sole plate. This groove has a section in the form of a right-angled isoceles triangle. The sides of each of these grooves 30 are respectively coupled tangentially to one of the sides of the groove 16 of the sole plate and, when the shoe rests on its guide rail, to one side of the guide rail groove.

As will be understood, the adjacent grooves of the rail and of the sole plate 15 form between them a rectilinear longitudinal conduit having a square cross section, which is symmetrically disposed with respect to the plane bisecting groove 16. The opposite grooves 30 of the plates 18 form between them a curved channel 33 of square cross section formed in the body of the guide shoe and forming a communication between the two extremities of the longitudinal conduit formed between the sole plate and the rail; the section of this channel is slightly greater than that of the longitudinal conduit 32.

When the guide shoe has been assembled and placed on its rail, the longitudinal conduit contains a series of cylindrical rollers comprising rollers 35 whose axes are disposed perpendicular to one face of the groove 16, alternating with rollers 36 having their axes arranged perpendicular to the other face of the same groove. The diameter of these rollers is made equal to the side of the square section of the longitudinal conduit formed between the guide shoe and the rail, while their axial height is chosen so as to be slightly less than the side of the said square section.

The curved channel 33 of square cross section formed in the body of the guide shoe also contains rollers with crossed axes, such as 35 and 36.

Thus, during a displacement of the guide shoe in the rail, the rollers 35 and 36 can roll freely in the longitudinal conduit formed between the grooves of the rail and of the guide shoe. These rollers are in fact supported, along two diametrically opposed generator lines, against two opposite faces of the longitudinal conduit, while there exists a slight play between their transverse faces and the two other opposite faces of the conduit. The clearance grooves (such as 17) at the bottom of the rail and sole plate triangular grooves facilitate the rolling action. The rollers 35 and 36 thus pass along the whole length of the longitudinal conduit from one extremity to the other extremity of this conduit. Assuming, for example, that the guide shoe moves over the fixed rail in the direction of the arrow 43 of FIGURE 2, the rollers 35 and 36 move in the conduit, with respect to groove 16, in the direction of the arrow 44. When they reach the extremity of this conduit, they are pushed on by the succeeding rollers and continue their travel in the recovery channel 33 (arrow 45). They thus return to the other extremity of the conduit. If the displacement of the guide shoe 11 continues, the same rollers 35 and 36 then again pass through the conduit in the direction indicated above. If the direction of movement of the guide shoe 11 is reversed, the direction of movement of the series of rollers 35 and 36 is immediately reversed also.

By reason of the perfect rolling action of the rollers 35 and 36 in the grooves forming the conduit, a guiding device of this kind has an efficiency which is considerably higher than the previously known guiding devices of the rail and guide shoe type; the force required for forward movement is practically eliminated.

By virtue of the relatively large contact surface of each roller with the rail and the guide shoe, this guiding device can withstand without damage very considerable loads, and is capable of operating for very long periods without appreciable wear under normal service conditions.

By means of the alternately crossed arrangement of the rollers, the lateral play of the guide shoe with respect to the rail is eliminated in a practically complete manner.

This guiding device can work at high speeds without risk of parasitic vibrations.

Moreover, the invention can be applied to the case in which the rail is movable while the guide shoe remains fixed.

It will also be noted that instead of providing holes such as are shown at 51 (FIGURE 1) in order to ensure the fixing of the guide shoe to fixed or moving members, it is also possible to arrange the guide shoe to be integral with the said member.

The structure thus far described is fully capable of giving satisfactory performance as long as the guide shoe remains on its associated guide rail. However, it often occurs that the guide shoe must be removed from the rail, to permit the transfer of the unit supported by the shoe to another location, for example. Such an operation, however, has proved difficult with the prior art roller bearing guide shoes because the direct removal of the shoe from the rail would have enabled the roller bearings to immediately escape from the shoes. It was thus necessary to resort to rather complex procedures to prevent such an occurrence during transfer of the shoes.

According to the present invention, this difficulty is avoided by the provision of retaining means, such as the illustrated clip-on cover member 6, placed over that longitudinal side of the shoe in which groove 16 is disposed. Member 6 is provided with end portions 7 which are formed to engage in notches 26 in the shoe end plates for holding the member on the shoe. Finally, the top section of the cover member is formed with a longitudinal slot 8 having tapered end portions. The slot is aligned with groove 16, and cover member 6 is positioned close enough to the outer longitudinal face of sole plate 15 to permit a substantial portion of each roller bearing to extend through the slot.

As may be clearly seen in FIGURE 3, it is only necessary for the cover member to be disposed just beyond two diagonal corners of the rectangle defining the cross section of the roller bearing, taken along a diametral plane thereof. As a result, almost 50% of the bearing may be permitted to extend through the slot and into the groove of the rail with which the shoe is to cooperate. This means that almost the entire length of the cylindrical surface of each roller bearing can be brought into contact with its associated rail groove, thereby enabling the roller bearings to have as large a load bearing area in the rail groove as they do in the sole plate groove 16.

The central section of slot 8 is given a width which is small enough to prevent the roller bearings from passing completely therethrough, yet large enough to allow these bearings sufficient play when the shoe is disposed on its guide rail. As is shown in FIGURE 3, member 6 thus acts as a highly effective cage for the roller bearings. As a general rule, the slot width will be sufficiently small when it is smaller than the greatest transverse dimension of the roller bearing, this dimension being defined as the length of a diagonal of the bearing rectangular cross section defined above. The ends of slot 8 are gradually tapered in the regions of the two extremities of channel 33 in such a way as to help guide the bearings into this channel.

As is suggested in FIGURE 3, it may be desirable to chamfer the periphery of slot 8 at a 45° angle so as to eliminate the presence of a sharp edge which might damage the rolling surface of the bearings.

The completely assembled shoe may be given as unbroken an outline as possible by the provision of longitudinal notches 28 (FIGURE 1) in plates 18 and 18' for receiving the longitudinal side walls of member 6.

It may thus be seen that the present invention serves to produce a guide shoe which is extremely simple and easy to assemble and disassemble and which lends itself to a wider variety of applications than do the prior art roller bearing devices.

It will be understood that the above description of the present invention is susceptible to various modifications, changes and adaptations, and the same are intended to be comprehended within the meaning and range of equivalents of the appended claims.

What is claimed is:

1. A roller bearing guide shoe comprising:
    (a) a unitary elongated sole plate having a longitudinal groove forming a bearing support surface, and a pair of end faces each of which is formed of at least two bearing contact surfaces lying in respective planes which are oblique to one another, each of said contact surfaces also being oblique to a longitudinal plane bisecting said groove;
    (b) a pair of flat plates joined together along said bisecting plane and each having a plurality of contact faces each of which coincides with a respective one of said contact surfaces of said sole plate located on the same side of said bisecting plane as the respective flat plate; and
    (c) roller bearing retaining means disposed adjacent said support surface for holding roller bearings in position with respect thereto, said retaining means being formed with a longitudinal slot for the passage of a portion of each roller bearing, the width of said slot being less than the largest dimension of said bearings taken perpendicular to their direction of motion.

2. A guide shoe for carrying a continuous train of roller bearings, said shoe comprising:
    (a) a unitary elongated sole plate having an inner longitudinal surface and an outer longitudinal surface in which is formed a longitudinal groove having a triangular cross section, the longitudinal extremities of said sole plate being defined by a pair of end faces; and
    (b) two flat plates joined to each other along the plane bisecting said longitudinal groove and each fitted around said sole plate in contact with said inner surface and said end faces of said sole plate, said flat plates being each provided with a groove forming a loop passing from one of said sole plate end faces to the other of said sole plate end faces, and being oriented so that, when said two flat plates are assembled together, the grooves therein cooperate to form a roller bearing recovery channel;
    (c) wherein the contact between each of said end faces and the corresponding faces of said flat plates is defined by at least two contact planes which are oblique to one another and to said longitudinal groove bisecting plane.

3. A device as recited in claim 2 wherein said two contact planes are symmetrically disposed with respect to said longitudinal groove bisecting plane.

4. A device as recited in claim 3 wherein said contact planes are oriented in such a way that the length of said sole plate outer surface is less than the length of said sole plate inner surface.

5. A device as recited in claim 4 wherein each of said end faces is tapered.

6. A device as recited in claim 2, further comprising a bearing retaining means rigidly mounted on said device and havng a longitudinal slot disposed adjacent said sole plate longitudinal groove, for permitting the roller bearings to extend partially through said slot, the width of said slot being less than the greatest transverse dimension of he roller bearings, taken perpendicular to the direction of motion of said bearings with respect to said sole plate groove.

7. A device as recited in claim 6 wherein said slot is tapered at each of its longitudinal ends.

References Cited by the Examiner

UNITED STATES PATENTS

| | | | |
|---|---|---|---|
| 2,230,442 | 2/1941 | Arms | 308—6 |
| 2,626,540 | 1/1953 | Eserkaln | 308—6 X |
| 2,681,836 | 6/1954 | Jarund | 308—6 |
| 2,785,934 | 3/1957 | Alderstom | 308—6 |
| 2,791,894 | 5/1957 | Duckworth | 64—23.7 |

FOREIGN PATENTS

| | | |
|---|---|---|
| 1,045,283 | 11/1953 | France. |
| 1,073,668 | 9/1954 | France. |
| 228,679 | 2/1909 | Germany. |

MARTIN P. SCHWADRON, *Primary Examiner.*

DAVID J. WILLIAMOWSKY, *Examiner.*

L. L. JOHNSON, *Assistant Examiner.*